United States Patent
Shirakata et al.

(10) Patent No.: US 7,251,503 B2
(45) Date of Patent: Jul. 31, 2007

(54) DIVERSITY RECEIVING APPARATUS AND WIRELESS RECEIVING APPARATUS USING THE SAME

(75) Inventors: Naganori Shirakata, Ibaraki (JP); Tomohiro Kimura, Hirakata (JP); Shuya Hosokawa, Hirakata (JP); Yasuo Harada, Maidenhead (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 210 days.

(21) Appl. No.: 10/533,207

(22) PCT Filed: Oct. 12, 2004

(86) PCT No.: PCT/JP2004/015346

§ 371 (c)(1),
(2), (4) Date: Apr. 28, 2005

(87) PCT Pub. No.: WO2005/036777

PCT Pub. Date: Apr. 21, 2005

(65) Prior Publication Data
US 2006/0025090 A1     Feb. 2, 2006

(30) Foreign Application Priority Data
Oct. 15, 2003   (JP) .............................. 2003-354826

(51) Int. Cl.
*H04B 1/38* (2006.01)

(52) U.S. Cl. ................... 455/562.1; 455/232.1; 455/277.1; 375/345; 375/347; 343/876

(58) Field of Classification Search ............... 455/101, 455/78, 134, 132, 562.1, 561, 277.2, 133, 455/277.1, 273, 424, 425, 550.1, 575.1, 456.5, 455/456.6, 63.1, 67.11, 67.13, 575.7, 127.2, 455/136, 137, 138, 232.1–250.1, 272, 295, 455/296, 334; 375/343, 347, 267, 144, 148, 375/100, 40, 132, 345; 370/334, 345; 343/876, 343/893, 895, 850, 702
See application file for complete search history.

(56) References Cited

U.S. PATENT DOCUMENTS

| | | | |
|---|---|---|---|
| 5,239,541 A * | 8/1993 | Murai | 370/345 |
| 5,241,701 A * | 8/1993 | Andoh | 455/272 |
| 5,339,452 A | 8/1994 | Sugawara | |
| 5,548,836 A * | 8/1996 | Taromaru | 455/277.1 |

(Continued)

FOREIGN PATENT DOCUMENTS

DE    102 10 238    10/2003

(Continued)

*Primary Examiner*—Edward F. Urban
*Assistant Examiner*—Charles Chow
(74) *Attorney, Agent, or Firm*—Wenderoth, Lind & Ponack, L.L.P.

(57) ABSTRACT

During all or part of a time period during which pattern signals are received, a diversity receiving apparatus allows a gain control section to fix the gain of a gain amplifier section, allows an antenna switching section to sequentially switch the selection of antennas during antenna switching periods which are synchronized with averaging periods, and determines an antenna to receive data contained in a packet, based on the levels of average powers measured by an averaging section on an averaging period-by-averaging period basis.

7 Claims, 9 Drawing Sheets

U.S. PATENT DOCUMENTS

| | | | | |
|---|---|---|---|---|
| 5,603,107 A | * | 2/1997 | Gottfried et al. | 455/133 |
| 5,634,204 A | * | 5/1997 | Takahashi et al. | 455/134 |
| 5,692,019 A | * | 11/1997 | Chang et al. | 375/347 |
| 5,918,164 A | * | 6/1999 | Takahashi et al. | 455/134 |
| 6,330,433 B1 | * | 12/2001 | Jager | 455/277.2 |
| 6,947,716 B2 | * | 9/2005 | Ono | 455/273 |
| 6,985,544 B2 | * | 1/2006 | Matsui et al. | 375/347 |
| 2002/0039912 A1 | * | 4/2002 | Yamaguchi et al. | 455/561 |
| 2002/0086648 A1 | * | 7/2002 | Wilhelmsson et al. | 455/101 |
| 2002/0118724 A1 | * | 8/2002 | Kishimoto et al. | 375/132 |
| 2003/0169706 A1 | | 9/2003 | Poegel et al. | |
| 2004/0179495 A1 | * | 9/2004 | Ramakrishnan et al. | 370/334 |
| 2004/0214529 A1 | * | 10/2004 | Terao | 455/78 |
| 2004/0266374 A1 | * | 12/2004 | Saed et al. | 455/134 |
| 2006/0030365 A1 | * | 2/2006 | Hovers et al. | 455/562.1 |
| 2006/0133544 A1 | * | 6/2006 | Kawada et al. | 375/343 |
| 2006/0135097 A1 | * | 6/2006 | Wang et al. | 455/132 |

FOREIGN PATENT DOCUMENTS

| | | |
|---|---|---|
| JP | 9-148973 | 6/1997 |
| JP | 2000-22670 | 1/2000 |

* cited by examiner

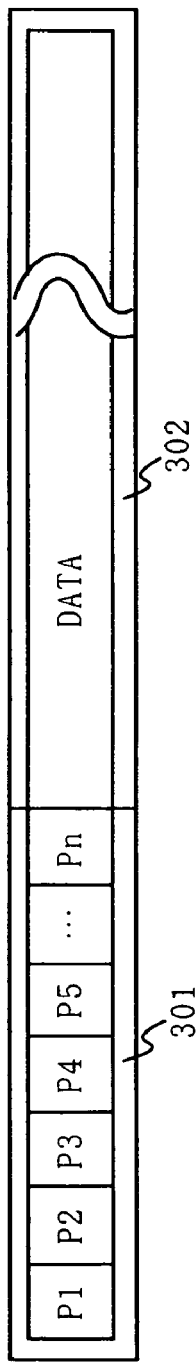
F I G. 2
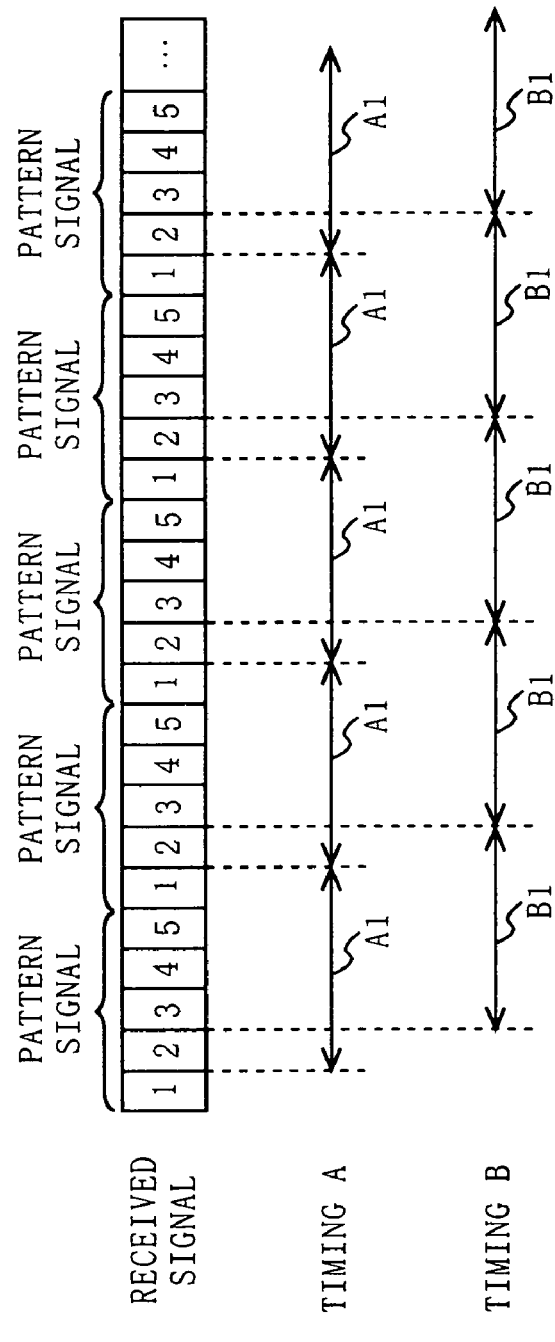
F I G. 3

DIVERSITY RECEIVING APPARATUS AND WIRELESS RECEIVING APPARATUS USING THE SAME

TECHNICAL FIELD

The present invention relates to a diversity receiving apparatus and a wireless receiving apparatus using the diversity receiving apparatus, and in particular to an antenna selection diversity receiving apparatus for selecting an antenna to receive a signal from a plurality of antennas and a wireless receiving apparatus using the antenna selection diversity receiving apparatus.

BACKGROUND ART

It is known that in mobile communications such as wireless LANS, the reception performance is degraded significantly by a fading phenomenon where the receiving electric field strength changes substantially due to reflection or scattering of radio waves. As reception techniques with which the influence of such a fading phenomenon is reduced, diversity reception methods are known for selecting a signal to demodulate from received signals obtained from a plurality of reception systems. The diversity reception methods include an antenna selection diversity reception method for selecting an antenna to receive a signal from a plurality of antennas.

Japanese Laid-Open Patent Publication No. 9-148973 discloses a conventional antenna selection diversity method. FIG. 10 is a block diagram showing a functional configuration of a conventional antenna selection diversity receiving apparatus 900 disclosed in Japanese Laid-Open Patent Publication No. 9-148973.

In the antenna selection diversity receiving apparatus 900 shown in FIG. 10, an antenna switching section 903 selects a signal from received signals received by first and second antennas 901 and 902, in response to an instruction from a control section 908. An AGC (Automatic Gain Control) circuit 904 controls a gain based on a control voltage from a control voltage generation section (hereinafter referred to as "VCO (Voltage Controlled Oscillator)") 905 such that the output signal level of the received signal having been selected by the antenna switching section 903 is constant. The VCO 905 inputs a control voltage for controlling the gain of the AGC circuit 904 to the AGC circuit 904 based on an output signal from the AGC circuit 904. The control section 908 determines the power level of the received signal based on a control voltage from the VCO 905. For example, in the case where the signal is received by the first antenna 901, once the control section 908 determines the power level of the received signal, next the control section 908 allows the antenna switching section 903 to switch the antenna to the second antenna 902 so that a signal can be received by the second antenna 902. The control section 908 then determines the power level of the received signal received by the second antenna 902 based on a control voltage from the VCO 905. Thereafter, the control section 908 compares between the power level obtained upon reception by the first antenna 901 and the power level obtained upon reception by the second antenna 902, and instructs, based on the result of the comparison, the antenna switching section 903 to select an antenna having received a signal at an appropriate power level, from the first and second antennas 901 and 902. An A/D conversion section 906 performs an A/D conversion on the received signal. A demodulation circuit 907 demodulates the digital signal from the A/D conversion section 906. In this manner, the conventional antenna selection diversity receiving apparatus 900 selects an appropriate antenna according to changes in reception performance, thereby avoiding significant degradation of reception performance.

The above-described conventional configuration, however, is unable to accurately determine a received power unless a feedback loop made up of the AGC circuit 904 and the VCO 905 is converged. Therefore, in the control section 908, a power comparison requires as much time as it takes for the feedback loop to converge. In addition, in the case where there is a great difference in received power between the two antennas, the power to be inputted to the AGC circuit 904 changes abruptly at the moment of switching from one antenna to another, and thus convergence of the feedback loop requires more time.

In high-speed wireless packet communications such as wireless LANs, a plurality of terminals send wireless packets at a given time. The preamble length of a wireless packet is only several μsec. Thus, the receiving side needs to select an antenna within a preamble period of several μsec; however, in the conventional configuration such as that described above, since the AGC for a received-power comparison takes a long time, the selection of an antenna requires a long period of time and accordingly it is not possible to select an antenna within a preamble period of several μsec.

SUMMARY OF THE INVENTION

Accordingly, an object of the present invention is to provide a diversity receiving apparatus with which an antenna having the highest received power level can be selected quickly in a short period of time for each arriving wireless packet, and a wireless receiving apparatus using such a diversity receiving apparatus.

To overcome the above-described problems, the present invention has the following aspects. The present invention is directed to a diversity receiving apparatus for receiving a packet having embedded therein symbols which are multiple repetitions of a pattern signal having a predetermined pattern, the apparatus comprising: a plurality of antennas; an antenna switching section for selecting an antenna from the plurality of antennas and outputting a signal received by the selected antenna as a received signal; a gain amplifier section for amplifying the received signal outputted from the antenna switching section and outputting the amplified signal; a gain control section for controlling a gain of the gain amplifier section; a power measurement section for measuring an instantaneous power of an output signal from the gain amplifier section; an averaging section for taking an average of the instantaneous power measured by the power measurement section on an averaging period-by-averaging period basis, and measuring the average powers, the averaging period having the same time length as one period of the pattern signal; and a control section for controlling the gain control section so that the gain amplifier section has a desired gain, and controlling a selection of the antennas made by the antenna switching section. During all or part of a time period during which the pattern signals are received, the control section allows the gain control section to fix the gain of the gain amplifier section, allows the antenna switching section to sequentially switch the selection of the antennas during antenna switching periods which are synchronized with the averaging periods, and determines an antenna to receive data contained in the packet, based on levels of the average powers measured by the averaging section on an averaging period-by-averaging period basis.

In a preferred embodiment, during a waiting time for the pattern signals, the control section may control the gain control section such that the gain amplifier section amplifies the received signal with a first fixed gain, and allow the antenna switching section to sequentially switch the selection of the antennas during the antenna switching periods, and if any of the levels of the average powers measured by the averaging section during the waiting time for the pattern signals exceeds a first threshold value, the control section may determine as the antenna to receive the data an antenna which had been selected during an averaging period where the highest average power was measured.

In such an embodiment, if any of the levels of the average powers measured by the averaging section during the waiting time for the pattern signals exceeds the first threshold value, the control section may compare between the average power exceeding the first threshold value and an average power measured during an averaging period subsequent to an averaging period where the average power exceeding the first threshold value is measured, and determine as the antenna to receive the data an antenna which had been selected during an averaging period where the highest average power was measured.

Further, if any of the levels of the average powers measured by the averaging section during the waiting time for the pattern signals exceeds a second threshold value which is higher than the first threshold value, the control section may control the gain control section such that the gain amplifier section amplifies the received signal with a second fixed gain which is lower than the first fixed gain, and allow the antenna switching section to sequentially switch the selection of the antennas during the antenna switching periods so that the plurality of antennas are all selected, and may determine as the antenna to receive the data an antenna which had been selected during an averaging period where the highest average power was measured among all average powers measured using the second gain.

The diversity receiving apparatus may further comprise: a correlation section for determining a correlation value between a signal outputted from the gain amplifier section and the pattern signal; and a correlation detection section for detecting a timing at which the pattern signal is received, based on the correlation value determined by the correlation section and the average power measured by the averaging section. If any of the levels of the average powers measured by the averaging section during the waiting time for the pattern signals is lower than the first threshold value and a reception of the pattern signal is detected by the correlation detection section, the control section may control the gain control section such that the gain amplifier section amplifies the received signal with a third fixed gain which is higher than the first fixed gain, and allow the antenna switching section to sequentially switch the selection of the antennas during the antenna switching periods so that the plurality of antennas are all selected, and may determine as the antenna to receive the data an antenna which had been selected during an averaging period where the highest average power was measured among all average powers measured using the third gain.

In another preferred embodiment, during a waiting time for the pattern signals, the control section may control the gain control section such that the gain amplifier section amplifies the received signal with a first fixed gain, and allow the antenna switching section to sequentially switch the selection of the antennas during the antenna switching periods, if any of the levels of the average powers measured by the averaging section during the waiting time for the pattern signals exceeds a second threshold value, the control section may control the gain control section such that the gain amplifier section amplifies the received signal with a second fixed gain which is lower than the first fixed gain, and allow the antenna switching section to sequentially switch the selection of the antennas during the antenna switching periods so that the plurality of antennas are all selected, and may determine as the antenna to receive the data an antenna which had been selected during an averaging period where the highest average power was measured among all average powers measured using the second gain.

In yet another preferred embodiment, the diversity receiving apparatus may further comprise: a correlation section for determining a correlation value between a signal outputted from the gain amplifier section and the pattern signal; and a correlation detection section for detecting a timing at which the pattern signal is received, based on a peak of the correlation value determined by the correlation section and the average power measured by the averaging section. During a waiting time for the pattern signals, the control section may control the gain control section such that the gain amplifier section amplifies the received signal with a first fixed gain, and allow the antenna switching section to sequentially switch the selection of the antennas during the antenna switching periods, if any of the levels of the average powers measured by the averaging section during the waiting time for the pattern signals is lower than a first threshold value and a reception of the pattern signal is detected by the correlation detection section, the control section may control the gain control section such that the gain amplifier section amplifies the received signal with a third fixed gain which is higher than the first fixed gain, and allow the antenna switching section to sequentially switch the selection of the antennas during the antenna switching periods so that the plurality of antennas are all selected, and may determine as the antenna to receive the data an antenna which had been selected during an averaging period where the highest average power was measured among all average powers measured using the third gain.

In still another embodiment, during a waiting time for the pattern signals, the control section may control the gain control section such that the gain amplifier section amplifies the received signal with a first fixed gain, and allow the antenna switching section to sequentially switch the selection of the antennas during the antenna switching periods, and if any of the levels of the average powers measured by the averaging section during the waiting time for the pattern signals exceeds a second threshold value, the control section may determine as the antenna to receive the data an antenna which had been selected during an averaging period where the average power exceeding the second threshold value was measured.

In another preferred embodiment, the diversity receiving apparatus may further comprise: a correlation section for determining a correlation value between a signal outputted from the gain amplifier section and the pattern signal; and a correlation detection section for detecting a timing at which the pattern signal is received, based on a peak of the correlation value determined by the correlation section and the average power measured by the averaging section. During a waiting time for the pattern signals, the control section may control the gain control section such that the gain amplifier section amplifies the received signal with a first fixed gain, and allow the antenna switching section to sequentially switch the selection of the antennas during the antenna switching periods, and if any of the levels of the average powers measured by the averaging section during the waiting time for the pattern signals is lower than a first threshold value and a reception of the pattern signal is detected by the correlation detection section, the control section may determine as the antenna to receive the data an antenna which had been selected during an averaging period where the average power lower than the first threshold value was measured.

In yet another preferred embodiment, the gain control section may control the gain of the gain amplifier section using a gain value based on an average power of a signal received by the antenna having been determined by the control section.

In addition, the present invention is directed to a wireless receiving apparatus for receiving a packet having embedded therein symbols which are multiple repetitions of a pattern signal having a predetermined pattern, the apparatus comprising: a diversity receiving apparatus for selecting anantenna and receiving the packet; and a demodulation section for demodulating a signal received by the diversity receiving apparatus. The diversity receiving apparatus includes: a plurality of antennas; an antenna switching section for selecting an antenna from the plurality of antennas and outputting a signal received by the selected antenna as a received signal; a gain amplifier section for amplifying, before or after a frequency conversion, the received signal outputted from the antenna switching section and outputting the amplified signal; a gain control section for controlling a gain of the gain amplifier section; a power measurement section for measuring an instantaneous power of an output signal from the gain amplifier section; an averaging section for taking an average of the instantaneous power measured by the power measurement section on an averaging period-by-averaging period basis, and measuring the average powers, the averaging period having the same time length as one period of the pattern signal; and a control section for controlling the gain control section so that the gain amplifier section has a desired gain, and controlling a selection of the antennas made by the antenna switching section. During all or part of a time period during which the pattern signals are received, the control section allows the gain control section to fix the gain of the gain amplifier section, allows the antenna switching section to sequentially switch the selection of the antennas during antenna switching periods which are synchronized with the averaging periods, and determines an antenna to receive data contained in the packet, based on levels of the average powers measured by the averaging section on an averaging period-by-averaging period basis.

According to the diversity receiving apparatus of the present invention, during all or part of a time period during which pattern signals having the same pattern are received, the gain is fixed and the average powers of received signals received by each antenna are determined. Then, the antenna to receive data is determined based on the levels of the average powers. Therefore, it is not necessary to wait for a feedback loop to converge in order to determine the average powers of received signals received by each antenna, making it possible to measure the average powers in a short time. In addition, since the gain is fixed, a comparison of levels between average powers can be easily made. Further, since an averaging period during which an average power is determined has the same time length as one period of a pattern signal, the diversity receiving apparatus can determine an average power in the same waveform at each averaging period, regardless of the timing at which averaging is performed, whereby the average powers can be compared more accurately.

If the level of a received signal is too high, the gain is lowered and the average power is measured again, and then the antenna to be selected is determined. If the level of a received signal is too low, the gain is raised and the average power is measured again, and then the antenna to be selected is determined. Thus, it is possible to make a comparison of powers in a wide range from a weak electric field to a strong electric field accurately in a short time.

Accordingly, an antenna having the highest received power can be selected quickly for each arriving wireless packet, and thus it is possible to establish a stable communication even in circumstances where there are changes in transmission environment. In addition, even in the case of receiving wireless packets to be sent from a plurality of terminals, because an antenna can be selected for each wireless packet, a stable communication can be achieved.

BRIEF DESCRIPTION OF THE DRAWINGS

FIG. 2 is a diagram showing a frame configuration of a packet to be received by the diversity receiving apparatus 1 according to the first embodiment.

FIG. 3 is a schematic diagram for describing that in the case where an averaging period has the same time length as one period of a pattern signal, the average power of a signal that repeats the same pattern can be determined regardless of the timing at which averaging is performed.

DETAILED DESCRIPTION OF PREFERRED EMBODIMENTS

First Embodiment

Figure 1:
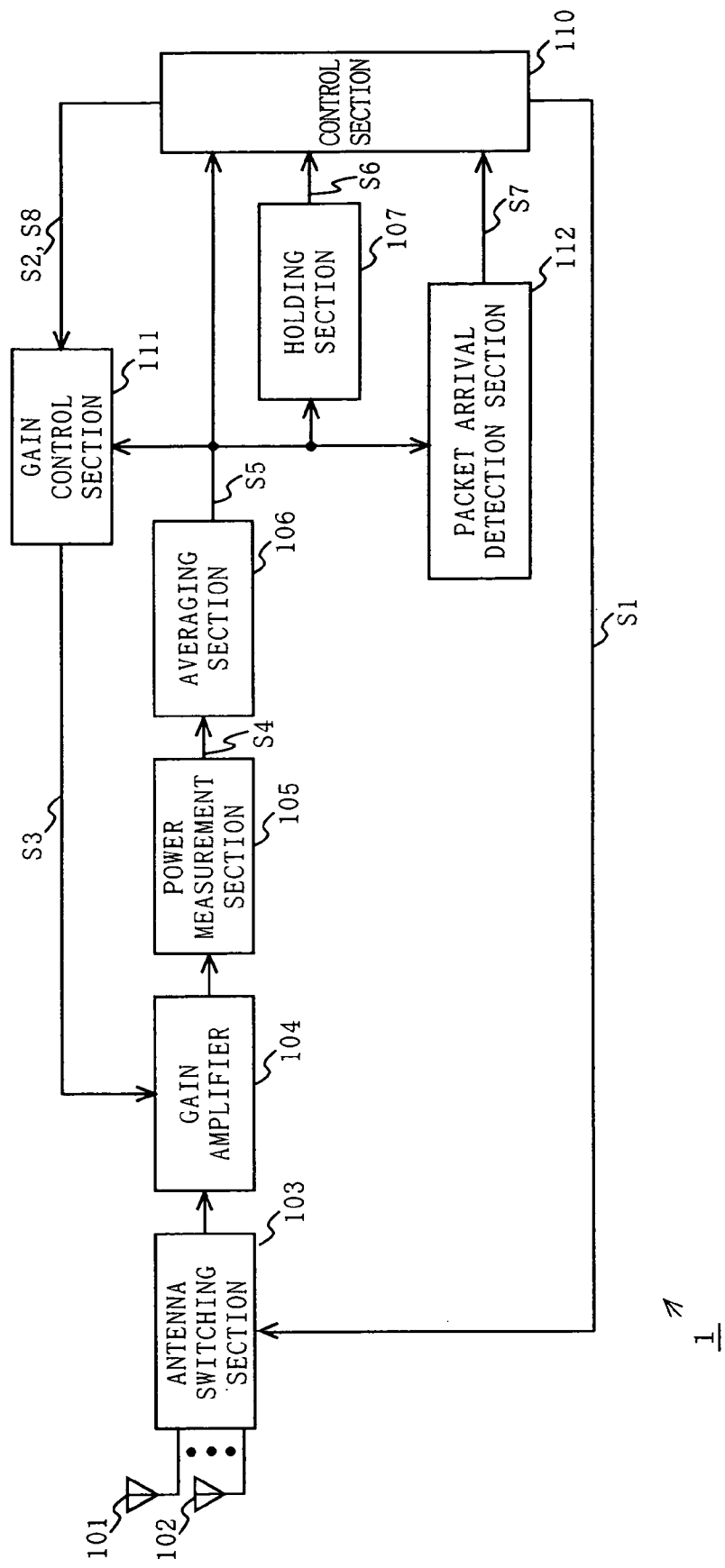
FIG. 1 is a block diagram showing a functional configuration of a diversity receiving apparatus 1 according to a first embodiment of the present invention.

FIG. 1 is a block diagram showing a functional configuration of a diversity receiving apparatus 1 according to a first embodiment of the present invention. In FIG. 1, the diversity receiving apparatus 1 includes a plurality of antennas (e.g., a first antenna 101 and a second antenna 102); an antenna switching section 103; a gain amplifier 104; a power measurement section 105; an averaging section 106; a holding section 107; a packet arrival detection section 112; a control section 110; and a gain control section 111.

FIG. 2 is a diagram showing a frame configuration of a packet to be received by the diversity receiving apparatus 1 according to the first embodiment. A packet includes a preamble section 301 and a data section 302. In the preamble section 301, a pattern signal having a pattern P of a predetermined waveform is repeated multiple times. In FIG. 2, for description purposes, a first arriving pattern signal is indicated as "P1" and a next arriving pattern signal is indicated as "P2". Similarly, the n-th arriving pattern signal is hereinafter indicated as "Pn". Any waveform can be used as the pattern P, however, it is more preferable to use a PN sequence, a chirp waveform, or the like having high self-correlation properties. In the data section 302, data to send and receive is stored. Note that although, in FIG. 2, pattern signals are contained in the preamble section 301, a region where pattern signals are contained is not limited thereto. The region can be any place as long as symbols which are multiple repetitions of a pattern signal are embedded in a region before data of a packet containing the data.

During a waiting state for receiving packets, i.e., during the waiting time for pattern signals, the control section 110 inputs to the antenna switching section 103 an antenna switching signal S1 for switching the antennas which are periodically selected. While waiting for a packet to arrive, the antenna switching section 103 sequentially switches the selection of the plurality of antennas in response to the antenna switching signal S1. Hereinafter, a predetermined period during which the antenna is switched to the antenna specified by the antenna switching signal S1 is referred to as an "antenna switching period". The characteristics of the antenna switching period will be described later.

Further, during the waiting time for pattern signals, the control section 110 inputs to the gain control section 111 a first gain switching signal S2 instructing the gain amplifier 104 to operate at a fist fixed gain. The gain control section 111 inputs to the gain amplifier 104 a gain control signal S3 indicating the first fixed gain in response to the first gain switching signal S2. The gain amplifier 104 amplifies the received signal inputted from the antenna switching section 103 with the first fixed gain in response to the gain control signal S3, and outputs the amplified signal.

The power measurement section 105 measures an instantaneous power S4 of the output signal of the gain amplifier 104 and inputs the instantaneous power S4 to the averaging section 106.

The averaging section 106 takes an average of the instantaneous power S4 inputted from the power measurement section 105, at predetermined periods. The predetermined period has the same length as the pattern P, i.e., the same time length as one period of the pattern signal. By this, all patterns of the signal at the predetermined periods during which the instantaneous power S4 is averaged become uniform. Hereinafter, such a predetermined period is referred to as an "averaging period".

FIG. 3 is a schematic diagram for describing that in the case where the averaging period has the same time length as one period of a pattern signal, the average power of a signal that repeats the same pattern can be determined regardless of the timing at which averaging is performed. In FIG. 3, for easier understanding, the pattern P is expressed by the number sequence "1, 2, 3, 4, 5". For timing A, the averaging section 106 repeatedly takes an average of the power of a signal having a pattern of "2, 3, 4, 5, 1" at averaging periods A1. For timing B, the averaging section 106 repeatedly takes an average of the power of a signal having a pattern of "3, 4, 5, 1, 2" at averaging periods B1. In this manner, in the case where the averaging period has the same time length as one period of a pattern signal, the averaging section 106 can take an average of the power of a signal that repeats the same pattern at each averaging period regardless of when averaging starts.

The antenna switching period to be specified by the antenna switching signal S1 has the same length as the pattern P and is synchronized with the averaging period. However, in the case where the antenna switching section 103 switches the antennas based on the antenna switching signal S1, a slight time delay is caused. Therefore, in some cases, the time period during which the antenna is actually switched may be longer than the length of the pattern P. However, since the antenna switching signal and the averaging period are synchronized with each other, the average power to be measured during one averaging period is substantially equal to the average of the instantaneous power received by a given antenna. Thus, as the antenna selected at a given averaging period, a given antenna can be specified.

The averaging section 106 inputs an average power S5 to the control section 110, the holding section 107, the gain control section 111, and the packet arrival detection section 112.

The holding section 107 holds average powers S5 associated with each antenna every time the antenna is switched from one to another. Although not shown in the drawing, an antenna switching signal S1 is inputted to the holding section 107 from the control section 110, and the holding section 107 controls the timing to hold an average power S5 in response to the antenna switching signal S1. Note that the holding section 107 may hold an average power S5 for each averaging period.

The packet arrival detection section 112 determines whether the average power S5 having been inputted from the averaging section 106 exceeds a predetermined first threshold value. If the average power S5 exceeds a first threshold value TH1, the packet arrival detection section 112 determines that a packet has arrived, and thus inputs a packet arrival signal S7 to the control section 110.

The control section 110 detects the arrival of a packet based on the packet arrival signal S7 from the packet arrival detection section 112, and when the arrival of a packet is detected, the control section 110 compares between an average power measured when the arrival of a packet is detected (when the average power S5 exceeds the first threshold value TH1) and an average power measured after such an event, and determines as the antenna to receive data an antenna which had been selected during an averaging period where the highest average power was measured. Thereafter, the control section 110 inputs to the antenna switching section 103 an antenna switching signal S1 to maintain use of the selected antenna until the completion of the reception of the packet being received. Subsequently, the control section 110 inputs to the gain control section 111 a second gain switching signal S8 instructing the gain amplifier 104 to operate as a variable gain amplifier so that the average power of the received signal received by the selected antenna has a predetermined value suitable for a data demodulation section (not shown).

When the second gain switching signal S8 is inputted to the gain control section 111, the gain control section 111 inputs a gain control signal S3 to the gain amplifier 104 so that the average power S5 outputted from the averaging section 106 has a predetermined value suitable for the data demodulation section (not shown), and controls the gain amplifier 104 such that the average power S5 has a predetermined value, while allowing the gain of the gain amplifier 104 to vary. By this, the output of the gain amplifier 104 is converged to a predetermined value.

The output signal of the gain amplifier 104 whose gain has been controlled is thereafter inputted to the data demodulation section (not shown) and the data section of the packet is demodulated. When the demodulation of the data section is complete, the control section 110 again returns to a reception wait state and repeats the above-described operations.

With reference to a specific example, assuming that there are two antennas, the operation of each section of the diversity receiving apparatus 1 will be described in detail below.

Figure 4:
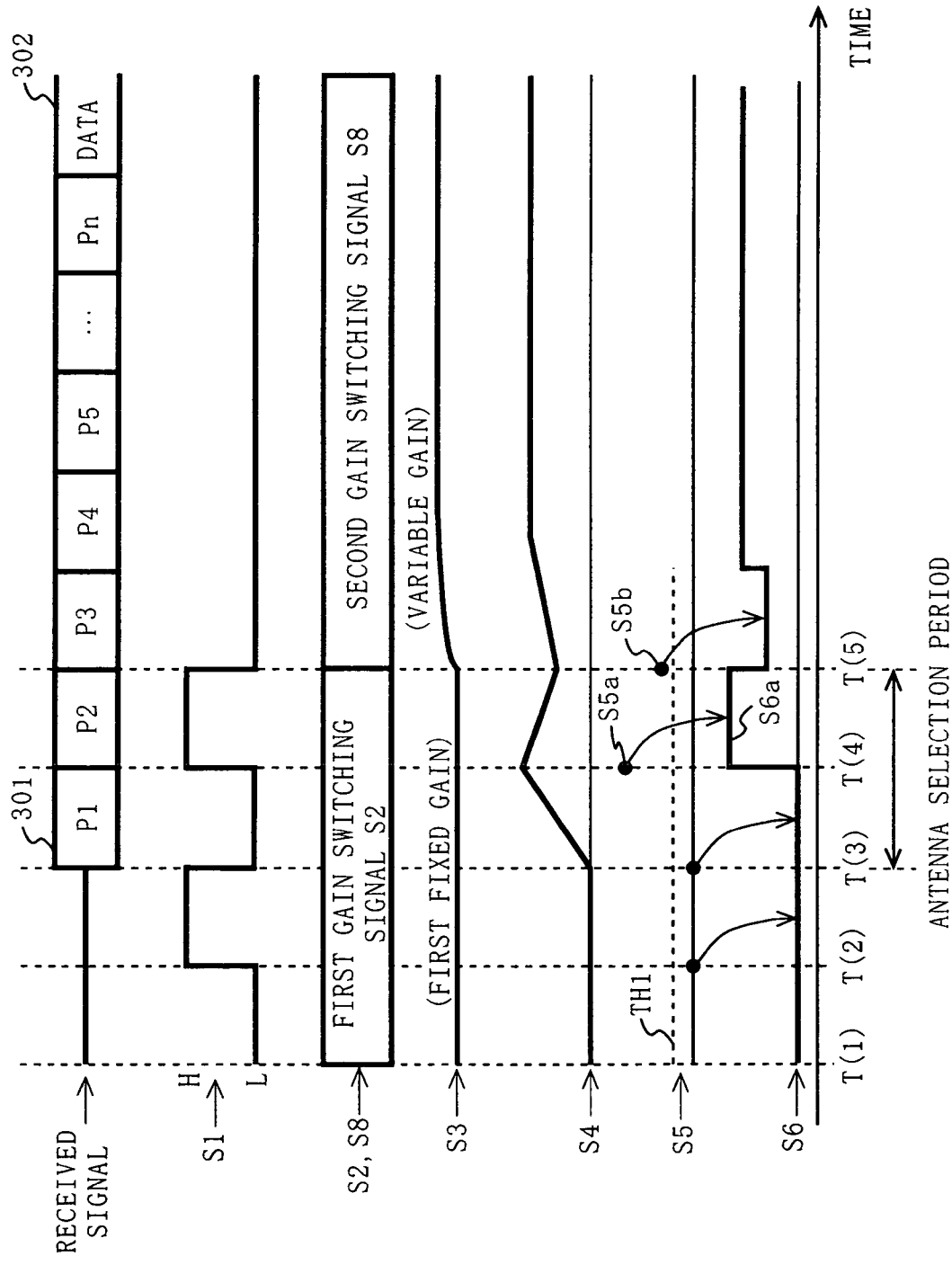
FIG. 4 is a timing chart showing the correlation between signals at the main portion of the diversity receiving apparatus 1 shown in FIG. 1.

FIG. 4 is a timing chart showing the correlation between signals at the main portion of the diversity receiving apparatus 1 shown in FIG. 1. Here, a description is provided assuming that the received power of the first antenna 101 is higher than that of the second antenna 102. However, it is easily understood that even in the reverse case the diversity receiving apparatus 1 operates in the same manner.

During the waiting time for receiving pattern signals (during the period from time T(1) to T(3)), a received signal is not inputted to the diversity receiving apparatus 1. During the reception waiting time, the control section 110 toggles an antenna switching signal S1 during predetermined antenna switching periods. Here, for simplifying the description, it is assumed that the interval at which the antenna is actually switched also has the same length as the pattern P. In addition, although FIG. 4 shows that the start time of the antenna switching period corresponds to the start time of the pattern signal, even if they do not correspond to each other, it can be seen that a signal that repeats the same pattern can be received every time the antenna is switched from one to another, by the same principles as those described in FIG. 3. In FIG. 4, in the case where the antenna switching signal S1 is at level L, the antenna switching section 103 selects the first antenna 101. In the case where the antenna switching signal S1 is at level H, the antenna switching section 103 selects the second antenna 102. The antenna switching period and the averaging period T (k+1)–T (k) each have the same length as the pattern P. Here, k is an integer greater than or equal to 1.

The control section 110 inputs a first gain switching signal S2 to the gain control section 111. Accordingly, the gain control section 111 inputs to the gain amplifier 104 a gain control signal S3 for fixing the gain of the gain amplifier 104 to a first fixed gain. By thus fixing the gain, an average power measured during a fixed gain period simply becomes proportional to the power of a received signal, and therefore it becomes possible to objectively compare between a received power measured when the antenna is switched to the first antenna 101 and a received power measured when the antenna is switched to the second antenna 102.

First, the antenna is switched to the first antenna 101 during the period from time T(1) to time T(2). The power measurement section 105 and the averaging section 106 measure the average power of such a period. Since the length of the averaging period is the same as the length of one pattern signal, the averaging section 106 determines average powers in the same waveform (pattern) for each antenna. Therefore, an accurate comparison of levels between the power of a signal received by the first antenna 101 and the power of a signal received by the second antenna 102 can be made in a short period of time. Since there is no signal during the period from time T(1) to time T(2), an instantaneous power S4 from the first antenna 101 is 0, and accordingly an average power S5 during the period from time T(1) to time T(2) which is determined at time T(2) is also 0. Note that in FIG. 4, the average power is indicated by a black dot. When the average power S5 during the period from time T(1) to time T(2) is determined at time T(2), the packet arrival detection section 112 compares between the average power S5 and a first threshold value TH1. If the average power S5 exceeds the first threshold value TH1, the packet arrival detection section 112 determines that a packet has arrived, and thus inputs to the control section 110 a packet arrival signal S7 indicating the arrival of a packet. Here, since the average power S5 does not exceed the first threshold value TH1, the packet arrival detection section 112 determines that a packet has not arrived. In this case, the control section 110 leaves the gain control section 111 to maintain the first fixed gain. Thereafter, the average power S5 measured by the averaging section 106 is held in the holding section 107. The holding section 107 outputs the average power S5 held therein as an average power S6 of the previous averaging period.

Next, during the period from time T(2) to time T(3), the antenna switching section 103 switches the antenna to the second antenna 102. Then, similarly, the gain amplifier 104 amplifies a received signal with the first fixed gain and outputs the amplified signal. The power measurement section 105 and the averaging section 106 determine an average power S5 at time T(3) and output the average power S5. During this period too, since there is no signal, the average power S5 of the output of the second antenna 102 is 0 at time T (3). The packet arrival detection section 112 compares between the first threshold value TH1 and the average power S5 of the second antenna 102. Since the average power S5 does not exceed the first threshold value TH1, the packet arrival detection section 112 determines that a packet has not arrived. In this case, the control section 110 leaves the gain control section 111 to maintain the first fixed gain. The average power S5 measured by the averaging section 106 is held in the holding section 107. In this manner, until the detection of the arrival of a packet, the diversity receiving apparatus 1 sequentially switches the two antennas during predetermined antenna switching periods using the first fixed gain, determines the average powers of received signals, and holds the average powers.

Assume that after time T(3) a packet is inputted. In the same manner as that performed during the period from time T(1) to time T(3), the antenna switching section 103 switches the antenna to the first antenna 101 during the period from time T(3) to time T(4). Then, similarly, the gain amplifier 104 amplifies a received signal with the first fixed gain and outputs the amplified signal. The instantaneous power S4 during the period from time T (3) to time T (4) shows an increasing tendency. The averaging section 106 determines, at time T(4), an average power S5a during the period from time T(3) to time T(4) and outputs the average power S5a. Here, it is assumed that the average power S5a exceeds the first threshold value TH1. Hence, the packet arrival detection section 112 inputs to the control section 110 a packet detection signal S7 indicating the arrival of a packet.

In response to the packet detection signal S7, the control section 110 starts a determination process of determining which receiving antenna should be selected. Specifically, first, the average power S5a of the first antenna 101 measured at the point of time T(4) is held in the holding section 107 as an average power S6a. Next, the control section 110 switches the antenna to the second antenna 102. Then, during an antenna switching period, i.e., the period from time T(4) to time T(5), the instantaneous power S4 of a signal from the second antenna 102 is measured by the power measurement section 105. The averaging section 106 determines, at the point of time T(5), an average power S5b during the period from time T(4) to time T (5) and inputs the average power S5b to the control section 110. The control section 110 compares between the average power S6a during the period from time T(3) to time T(4) held in the holding section 107, and the average power S5b during the period from time T(4) to time T(5) inputted from the averaging section 106. Here, since the average power S6a is higher than the average power S5b, the control section 110 determines the first antenna 101 to be selected after time T(5), for the reason that the first antenna 101 can obtain a higher received power than the second antenna 102.

In this manner, during the period from time T(3) to time T(5), the diversity receiving apparatus 1 fixes the gain of the gain amplifier 104 and sequentially switches the selection of the antennas, and thereby determines the average powers of received signals received by each antenna and determines an antenna to receive data based on the levels of the determined average powers. The period during which the average powers of received signals received by each antenna is obtained to determine the antenna, such as the period from time T(3) to time T(5), is referred to as an "antenna selection period".

Once the first antenna 101 is selected, the control section 110 thereafter fixes the antenna selection signal S1 to level L which selects the first antenna 101, until the reception of a packet is complete. Next, the control section 110 inputs to the gain control section 111 a second gain switching signal S8 for allowing the gain amplifier 104 to serve as a variable gain amplifier. In response to the second gain switching signal S8, the gain control section 111 performs a feedback control where the gain of the gain amplifier 104 is adjusted with reference to the average power S5 outputted from the averaging section 106, so that the reception average power of the selected antenna has a predetermined value suitable for the data demodulation section (not shown). By this, the average power S5 is converged to a predetermined value.

As described above, in the first embodiment, during the antenna selection period, the diversity receiving apparatus 1 fixes the gain, determines the average powers of received signals received by each antenna, and selects the antenna to receive data based on the levels of the average powers. Therefore, it is not necessary to wait for the feedback loop to converge in order to determine the average powers of received signals received by each antenna, making it possible to measure the average powers in a short period of time. In addition, since the gain is fixed, a comparison of levels between average powers can be easily made. Further, since an averaging period for determining an average power has the same time length as one period of a pattern signal, the diversity receiving apparatus 1 can determine an average power in the same waveform at each averaging period, regardless of the timing at which averaging is performed, whereby the average powers can be compared more accurately. Accordingly, a diversity receiving apparatus can be provided with which an antenna having the highest received power level can be selected quickly in a short period of time for each arriving wireless packet.

Note that in the first embodiment, the holding section 107 holds an average power measured during the previous averaging period, and the control section 110 compares between the holding content of the holding section 107 and an average power measured during the current averaging period to identify which average power is higher. However, the holding section 107 is not necessary provided that a comparison of average powers for each averaging period is made. For example, the control section 110 may store information about average powers every time an average power is inputted from the averaging section 106 and determine which average power is highest at the stage of determining the antenna, whereby the antenna may be determined. Alternatively, the control section 110 may determine the levels of average powers every time an average power is inputted, store information about a higher average power, and then determine an antenna corresponding to the stored information about a higher average power, at the stage of determining the antenna.

Note that although, in the first embodiment, the antenna selection period is made up of an averaging period (the period from time T(3) to time T(4)) during which the average power exceeds the first threshold value TH1 and a subsequent averaging period, the antenna selection period is not limited thereto as long as the antenna selection period is present in all or part of a time period during which pattern signals are received. For example, after the average power exceeds the first threshold value TH1, with the first fixed gain being maintained, the diversity receiving apparatus 1 may again allow the antenna switching section 103 to sequentially select all antennas and determine as the antenna to receive data an antenna having the highest average power among obtained average powers. Alternatively, the antenna selection period may be present after a certain time has elapsed from the time when the average power had exceeded the first threshold value TH1. In any case, if the average power exceeds the first threshold value TH1, an antenna which had been selected during an averaging period where the highest average power was measured should be determined as the antenna to receive data.

Note that although the above describes the operation mainly for the case where there are two antennas, even in the case where there are three or more antennas, the diversity receiving apparatus operates in the same manner as that described above. Specifically, the antenna switching section selects one antenna from a plurality of antennas in response to an antenna switching signal having different levels according to the number of antennas, and outputs a signal received by the selected antenna as a received signal. During the waiting time for pattern signals, the control section controls the gain amplifier such that the gain amplifier operates at the first fixed gain, and allows the antenna switching section to sequentially switch a plurality of antennas. If an average power which exceeds the first threshold value is measured during the waiting time for pattern signals, the control section compares, during the antenna selection period, between the average power exceeding the first threshold value and an average power measured after such an average power, and determines as the antenna to receive data an antenna which had been selected during an averaging period where the highest average power was measured.

Second Embodiment

The block configuration of a diversity receiving apparatus according to a second embodiment of the present invention is the same as that of the first embodiment, and thus FIG. 1 is incorporated herein. In using the first embodiment, in the case where a received power is very high, if the gain amplifier 104 amplifies a received signal with the first fixed gain, the measured value may be saturated in the power measurement section 105 and accordingly an instantaneous power may not be determined accurately. In view of this, in the second embodiment, in the case where a received power is very high, the control section 110 switches the gain to a second fixed gain which is lower than the first fixed gain to adjust the measured value so that the measured value is not saturated in the power measurement section 105, and then determines average powers for each selected antenna.

Figure 5:
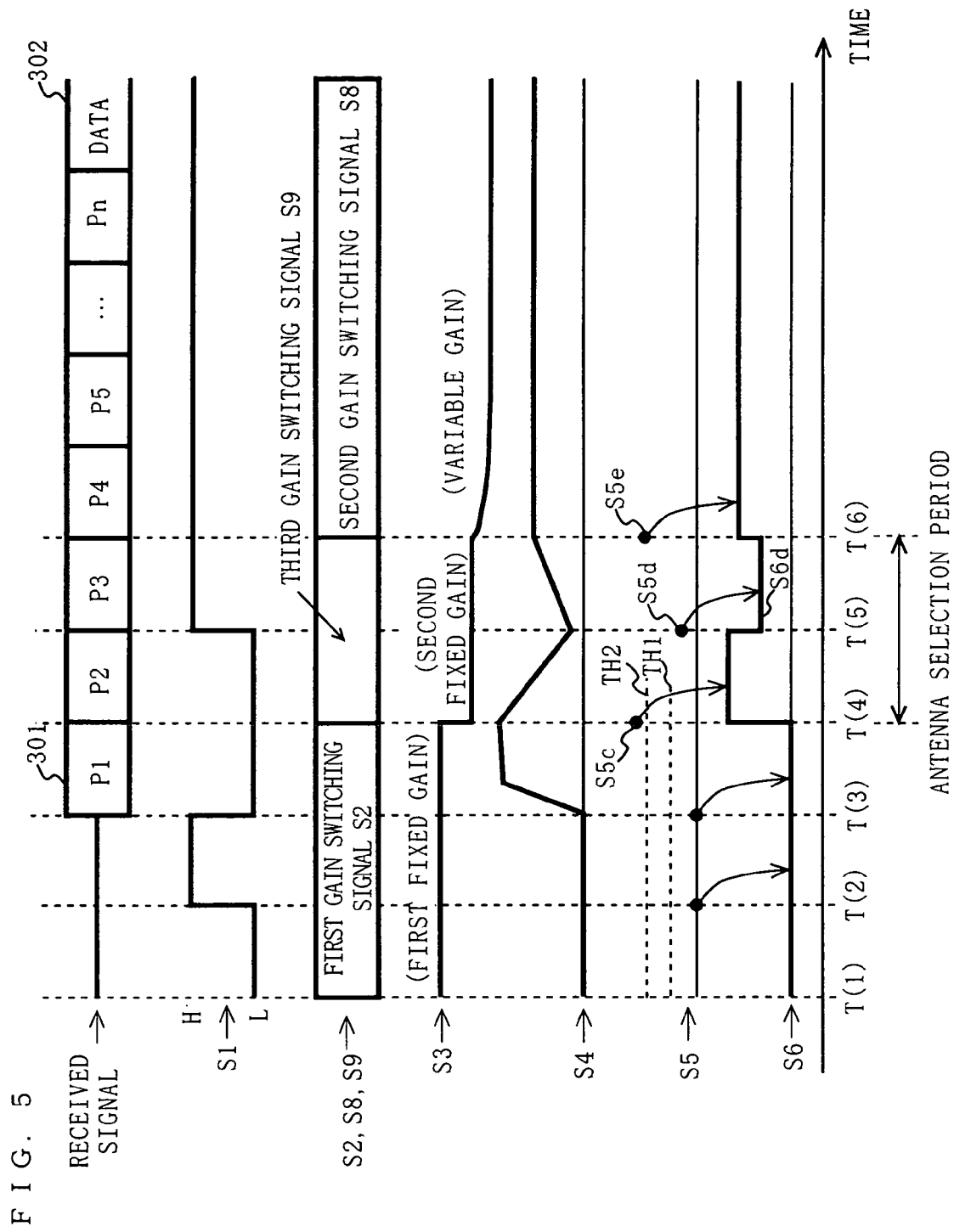
FIG. 5 is a timing chart showing the correlation between signals at the main portion of a diversity receiving apparatus according to a second embodiment.

FIG. 5 is a timing chart showing the correlation between signals at the main portion of a diversity receiving apparatus according to the second embodiment. With reference to FIG. 5, the operation of the diversity receiving apparatus according to the second embodiment will be described below. Note that for simplifying the description, the following describes the case where there are two antennas.

During the period from time T(1) to time T(3), as in the case of the first embodiment, the diversity receiving apparatus measures an average power S5 every time the antenna is switched from one to another, and allows a holding section 107 to hold the average powers S5.

Here, it is assumed that a very large signal is inputted during the period from time T(3) to time T(4). A power measurement section 105 measures an instantaneous power S4 generated during the period from time T(3) to time T(4). An averaging section 106 measures, at time T(4), an average power S5c of a signal received by a first antenna 101 which is generated during the period from time T(3) to time T(4). A control section 110 determines whether the average power S5c of the first antenna 101 obtained at time T(4) exceeds a second threshold value TH2 which is higher than a first threshold value TH1. For example, the second threshold value TH2 may be set to a limit value at which an accurate value of an average power cannot be obtained. Here, the average power S5c is assumed to exceed the second threshold value TH2. In this manner, if the average power exceeds the second threshold value TH2, the control section 110 determines that there is inputted a large signal that the average power cannot be measured accurately with the use of the first fixed gain. The control section 110 thus controls a gain control section 111 and an antenna switching section 103 so that the average power is re-measured with a lowered gain.

Specifically, first, the control section 110 leaves an antenna switching signal S1 as it is without switching to another antenna. Next, the control section 110 inputs to the gain control section 111 a third gain switching signal S9 instructing to use the second fixed gain which is lower than the first fixed gain. When the third gain switching signal S9 is inputted, the gain control section 111 lowers the gain of a gain amplifier 104 to the second fixed gain. By this, the power measurement section 105 can measure an instantaneous power without causing saturation.

During the period from time T(4) to time T(5), the power measurement section 105 measures the instantaneous power S4 of the signal from the first antenna 101. Then, at time T(5), the averaging section 106 measures an average power S5d of the signal from the first antenna 101 which is generated during the period from time T(4) to time T(5). Once the average power S5d of the signal from the first antenna 101 is determined at time T(5), the averaging section 106 allows the holding section 107 to hold the average power S5d as an average power S6d.

Subsequently, the control section 110 brings the antenna switching signal S1 to level H and allows the antenna switching section 103 to switch the antenna to a second antenna 102. Then, the power measurement section 105 measures the instantaneous power S4 of a signal amplified during the period from time T(5) to time T(6), by the gain amplifier 104, with the second fixed gain. The averaging section 106 measures, at time T(6), an average power S5e of the signal from the second antenna 102 which is generated during the period from time T(5) to time T(6). Upon the determination of the average power S5e of the signal from the second antenna 102 at time T(6), the control section 110 compares levels between the average power S6d of the previous antenna switching period which is held in the holding section 107, and the average power S5e of the current antenna switching period. Here, since the average power S5e is higher than the average power S6d, the control section 110 selects the second antenna 102. In the second embodiment, the period during which the average powers of the antennas are measured using the second fixed gain serves as the antenna selection period.

Once the receiving antenna is selected, the control section 110 thereafter fixes the antenna switching signal S1 to level H which selects the second antenna 102, until the reception of a packet is complete. Next, the control section 110 inputs a second gain switching signal S8 to the gain control section 111. In response to the second gain switching signal S8, the gain control section 111 performs a feedback control where the gain of the gain amplifier 104 is adjusted with reference to the average power S5 outputted from the averaging section 106, so that the reception average power of the selected antenna has a predetermined value suitable for a data demodulation section (not shown). By this, the average power S5 is converged to a predetermined value.

As described above, in the second embodiment, during the waiting time for pattern signals, the diversity receiving apparatus receives pattern signals with the first fixed gain and measures average powers. If the average power exceeds the second threshold value, the diversity receiving apparatus lowers the gain to the second fixed gain which is lower than the first fixed gain, for the reason that the level of the received signal is too high. Then, the diversity receiving apparatus determines, during the antenna selection period, the average powers of the antennas for the case where the second fixed gain is used, and then selects the antenna to receive data based on the levels of the average powers. Accordingly, even in the case where a signal with a high power is inputted, the average powers can be re-measured with a lowered fixed gain, making it possible to accurately measure powers without causing the power measurement section to saturate. Accordingly, in addition to an advantage provided by the first embodiment, the diversity receiving apparatus has an advantage in that an antenna capable of obtaining a higher received power can be selected properly.

Note that although, in the second embodiment, the antenna selection period is made up of an averaging period during which the average power exceeds the second threshold value TH2 and a subsequent averaging period, the antenna selection period is not limited thereto as long as the antenna selection period is present in all or part of a time period during which pattern signals are received. For example, the antenna selection period may be present after a certain time has elapsed from the time when the average power had exceeded the second threshold value TH2. In any case, if the average power exceeds the second threshold value TH2, all antennas are selected again using a fixed gain, the average powers for each antenna are measured, and then the antenna is determined based on the comparison of the average powers.

Note that although the above describes the operation mainly for the case where there are two antennas, even in the case where there are three or more antennas, the diversity receiving apparatus operates in the same manner as that described above. Specifically, during the waiting time for pattern signals, the control section of the diversity receiving apparatus controls the gain control section such that the gain amplifier section amplifies a received signal with the first fixed gain. Further, the control section allows the antenna switching section to sequentially switch the selection of the antennas during antenna switching periods. In the case where the level of an average power measured by the averaging section during the waiting time for pattern signals exceeds the second threshold value, the control section controls the gain control section such that the gain amplifier section amplifies a received signal with the second fixed gain which is lower than the first fixed gain. In addition, the control section allows the antenna switching section to sequentially switch the selection of antennas during antenna switching periods so that a plurality of antennas can all be selected. In this case, the period during which all antennas are switched serves as the antenna selection period. Then, during the antenna selection period, the control section determines as the antenna to receive data an antenna which had been selected during an averaging period where the highest average power was measured among all average powers measured using the second gain.

Note that needless to say, the processing according to the second embodiment can be incorporated in the diversity receiving apparatus according to the first embodiment. Namely, first, an average power which exceeds the first threshold value TH1 is measured, and then if the average power exceeds the first threshold value TH1 but not exceed the second threshold value TH2, the diversity receiving apparatus performs the processing according to the first embodiment. On the other hand, if the average power exceeds the second threshold value TH2 too, the diversity receiving apparatus performs the processing according to the second embodiment.

Note that in the second embodiment, if the average power exceeds the second threshold value TH2, in order to select an antenna capable of obtaining a higher received power, the gain is lowered and the average powers of all antennas are re-measured during the antenna selection period. However, because an antenna which had been selected during an averaging period where an average power exceeding the second threshold value TH2 was measured is capable of obtaining a sufficiently high average power, the diversity receiving apparatus may determine such an antenna as the antenna to receive data. By this, the antenna can be selected in a shorter period of time.

Third Embodiment

Figure 6:
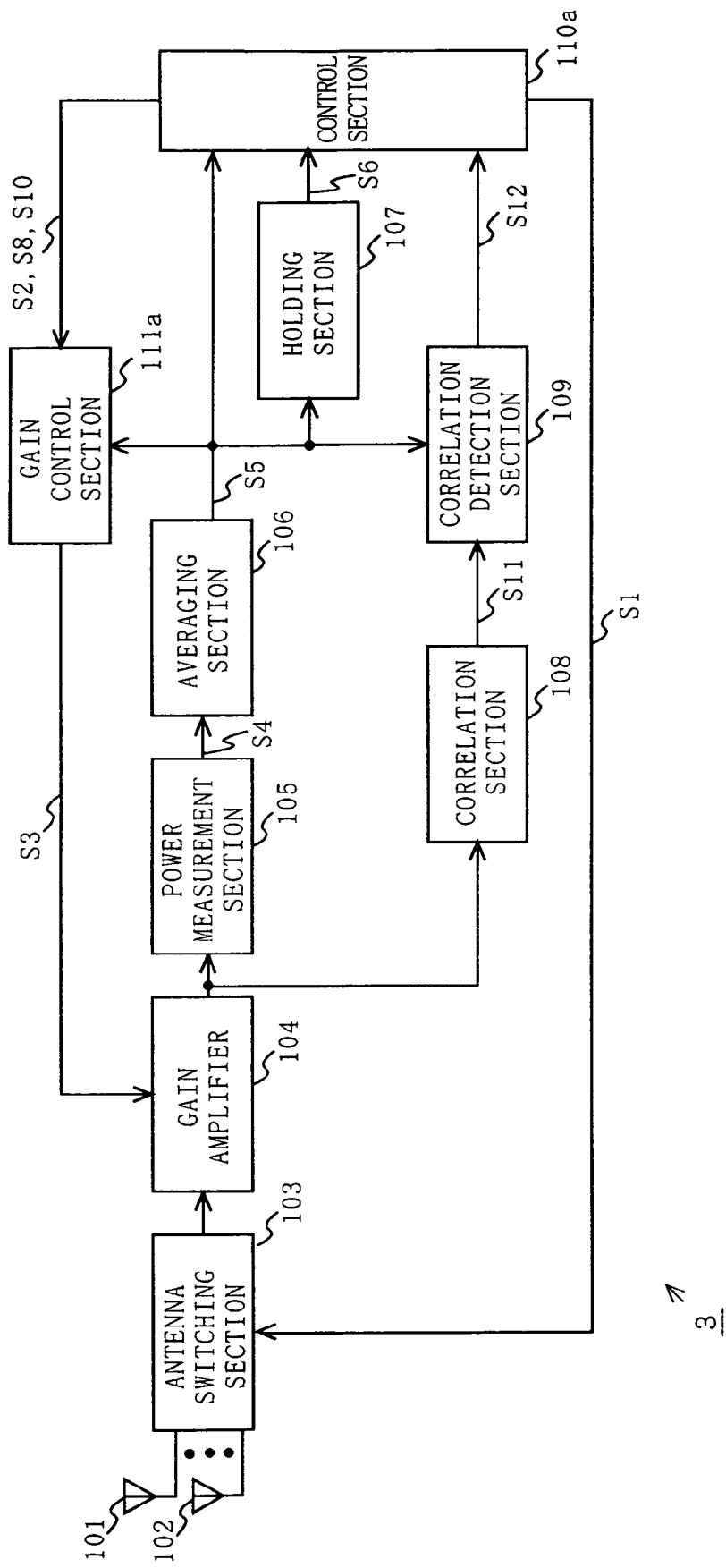
FIG. 6 is a block diagram showing a functional configuration of a diversity receiving apparatus 3 according to a third embodiment of the present invention.

FIG. 6 is a block diagram showing a functional configuration of a diversity receiving apparatus 3 according to a third embodiment of the present invention. In FIG. 6, elements having the same functions as those in the first embodiment are denoted by the same reference numerals and the description thereof will be omitted. In FIG. 6, the diversity receiving apparatus 3 includes a plurality of antennas (e.g., a first antenna 101 and a second antenna 102); an antenna switching section 103; a gain amplifier 104; a power measurement section 105; an averaging section 106; a holding section 107; a correlation section 108; a correlation detection section 109; a control section 110a; and a gain control section 111a.

In the case of using the first embodiment, if a received power is very low, even if the gain amplifier 104 amplifies a received signal with the first fixed gain, the received signal may be buried in the noise level and an instantaneous power may not be measured accurately by the power measurement section 105. In view of this, in the third embodiment, if a received power is very low, the control section 110a switches the gain to a third fixed gain which is higher than the first fixed gain so that the power measurement section 105 can measure an instantaneous power.

Figure 7:
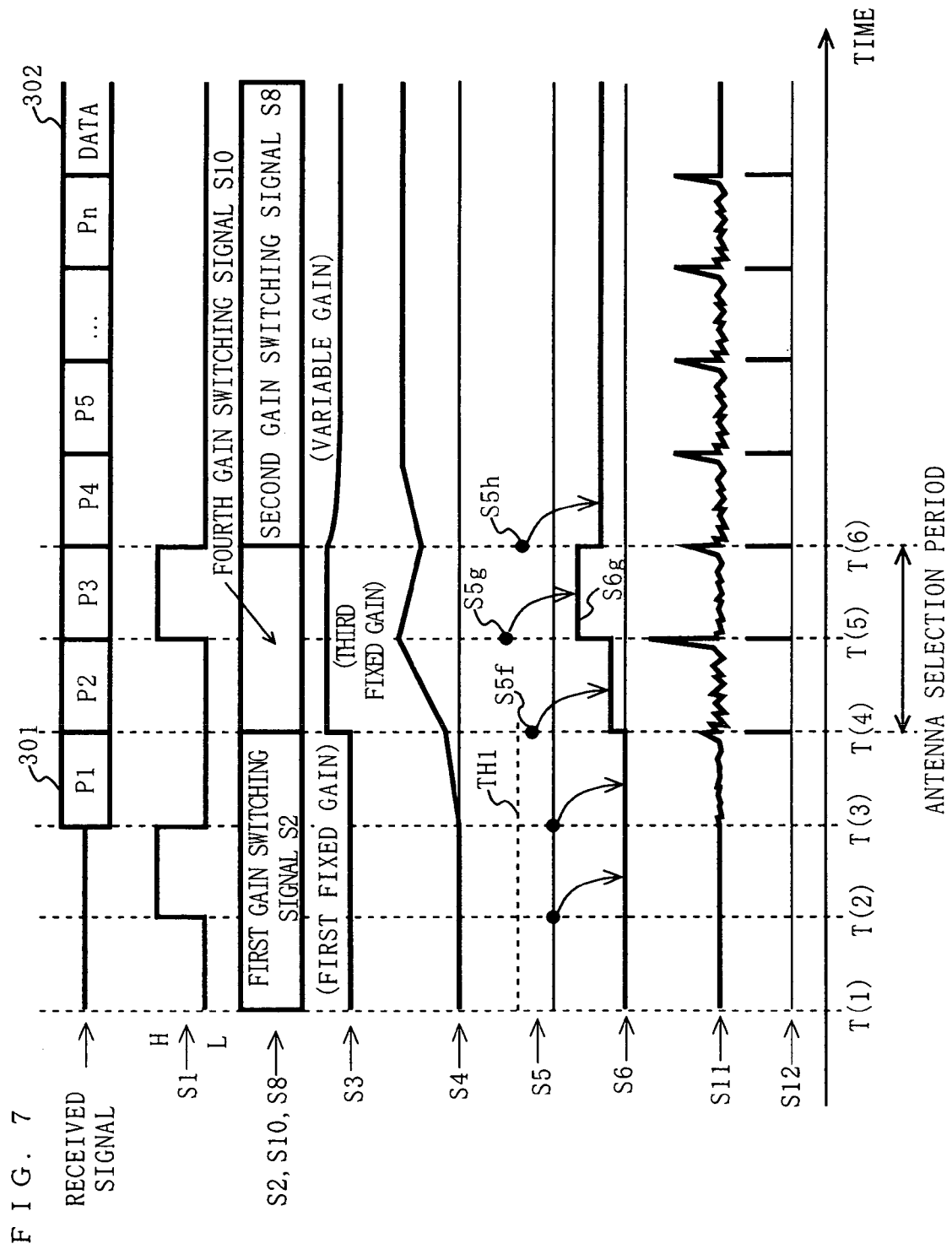
FIG. 7 is a timing chart showing the correlation between signals at the main portion of the diversity receiving apparatus 3 according to the third embodiment.

FIG. 7 is a timing chart showing the correlation between signals at the main portion of the diversity receiving apparatus 3 according to the third embodiment. With reference to FIG. 7, the operation of the diversity receiving apparatus 3 according to the third embodiment will be described below.

The correlation section 108 recognizes in advance the waveform of a pattern P, and sweeps the pattern P during an antenna switching period or an averaging period, determines the correlation between an output of the gain amplifier 104 and the pattern P, and outputs a correlation value S11. The correlation value S11 reaches its peak at a timing at which the pattern P and a pattern Pk in a received signal agree with each other. Here, k is any integer of 1 to n.

The correlation detection section 109 compares between the correlation value S11 and an average power S5 outputted from the averaging section 106, detects a timing at which the peak of the correlation value S11 appears, and then outputs, at such a timing, a correlation detection signal S12 indicating the arrival of a pattern signal. Specifically, the correlation detection section 109 detects a timing at which the correlation value S11 becomes higher than the average power S5, determines at such a timing that the correlation value S11 reaches its peak, and then outputs the correlation detection signal S12 at such a timing. If the arrival of a pattern signal is detected based on whether the correlation value S11 exceeds a certain threshold value, in the case where the reception level is low, the correlation value also becomes low and thus the arrival of a pattern signal cannot be detected. On the other hand, as described above, by detecting the arrival of a pattern signal based on whether the correlation value exceeds the average power, the peak of the correlation value S1 can be detected correctly, regardless of the levels of received powers for each antenna.

During the period from time T(1) to time T(3), as in the case of the first embodiment, the diversity receiving apparatus 3 measures the average power S5 every time the antenna is switched from one to another, and allows the holding section 107 to hold the average powers S5. During this period, a received signal is not inputted, and thus neither the correlation value S11 nor the correlation detection signal S12 is outputted.

Here, it is assumed that a very small signal is inputted at time T(3). The power measurement section 105 measures an instantaneous power S4 generated during the period from time T(3) to time T(4). The averaging section 106 measures, at time T(4), an average power S5f of a signal received by the first antenna 101 which is generated during the period from time T(3) to time T(4). Here, since the average power S5f of the first antenna is assumed not to exceed the first threshold value TH1, the packet arrival detection section 112 according to the first embodiment cannot recognize the arrival of a packet. In the third embodiment, however, the correlation section 108 detects the correlation value S11 between an output of the gain amplifier 104 and the pattern P, and if the correlation value S11 is higher than or equal to the average power S5, the correlation detection section 109 outputs the correlation detection signal S12. When the correlation detection signal S12 is inputted from the correlation detection section 109, the control section 110a determines that a signal with a very low power is inputted, and thus inputs to the gain control section 111a a fourth gain switching signal S10 instructing the gain control section 111a to raise the gain and re-measure average powers. Upon the output of the fourth gain switching signal S10, the control section 110a leaves the antenna switching signal S1 at level L.

In response to the fourth gain control signal S10, the gain control section 111a inputs to the gain amplifier 104 a gain control signal S3 which allows the gain amplifier 104 to operate at a third fixed gain. The third fixed gain is higher than the first fixed gain. Accordingly, the gain amplifier 104 amplifies the signal with the third fixed gain, whereby the power measurement section 105 can measure the instantaneous power S4 of the small received signal without causing the received signal to be buried in the noise level. In this manner, the instantaneous power S4 generated during the period from time T(4) to time T(5) is estimated, and the averaging section 106 can measure, at time T(5), an average power S5g of the signal from the first antenna 101 generated during the period from time T(4) to time T(5). The averaging section 106 allows the holding section 107 to hold the average power S5g measured at time T(5), as an average power S6g.

Next, the control section 110a brings the antenna switching signal S1 to level H so that the antenna is switched from the first antenna 101 to the second antenna 102. During the period from time T(5) to time T(6), the power measurement section 105 measures the instantaneous power S4. The averaging section 106 measures, at time T(6), an average power S5h of a signal from the second antenna 102 generated during the period from time T(5) to time T(6). Next, the control section 110a compares levels between the average power S6g of the previous antenna switching period which is held in the holding section 107, and the average power S5 of the current antenna switching period. Here, since the average power S6g is higher, the control section 110 a selects the first antenna 101. In the third embodiment, the period during which the average powers of the antennas are measured using the third fixed gain serves as the antenna selection period.

Once the receiving antenna is selected, the control section 110a thereafter fixes the antenna switching signal S1 to level L which selects the first antenna 101, until the reception of a packet is complete. Next, the control section 110a inputs a second gain switching signal S8 to the gain control section 111a. In response to the second gain switching signal S8, the gain control section 111a performs a feedback control where the gain of the gain amplifier 104 is adjusted with reference to the average power S5 outputted from the averaging section 106, so that the reception average power of the selected antenna has a predetermined value suitable for a data demodulation section (not shown). By this, the average power S5 is converged to a predetermined value.

As described above, in the third embodiment, during the waiting time for pattern signals, the diversity receiving apparatus receives pattern signals with the first fixed gain and determines average powers and a correlation value. If the average power does not exceed the first threshold value but the correlation value exceeds the average power, the diversity receiving apparatus determines that a pattern signal with a low reception level is inputted, and thus raises the gain to the third fixed gain which is higher than the first fixed gain. Then, the diversity receiving apparatus determines, during the antenna selection period, the average powers of the antennas for the case where the third fixed gain is used, and then selects the antenna to receive data based on the levels of the average powers. Accordingly, even in the case where a signal with a low power is inputted, the average powers can be re-measured with a raised fixed gain, making it possible to accurately measure powers without causing the received signal to be buried in the noise level; accordingly, in addition to an advantage provided by the first embodiment, the diversity receiving apparatus has an advantage that an antenna capable of obtaining a higher received power can be selected properly.

Note that although, in the third embodiment, the antenna selection period is made up of an averaging period during which a correlation is detected and a subsequent averaging period, the antenna selection period is not limited thereto as long as the antenna selection period is present in all or part of a time period during which pattern signals are received. For example, the antenna selection period may be present after a certain time has elapsed from the time when a correlation had been detected. In any case, in the case where a correlation is detected, all antennas are selected again using a fixed gain, the average powers for each antenna are measured, and then the antenna is determined based on the comparison of the average powers.

Note that although the above describes the operation mainly for the case where there are two antennas, even in the case where there are three or more antennas, the diversity receiving apparatus operates in the same manner as that described above. Specifically, during the waiting time for pattern signals, the control section 110a of the diversity receiving apparatus 3 controls the gain control section 111a such that the gain amplifier 104 amplifies a received signal with the first fixed gain. Further, the control section 110a allows the antenna switching section 103 to sequentially switch the selection of the antennas during antenna switching periods. If the level of the average power measured by the averaging section 106 during the waiting time for pattern signals is lower than the first threshold value and the reception of a pattern signal is detected by the correlation detection section 109, the control section 110a controls the gain control section 111a such that the gain amplifier 104 amplifies a received signal with the third fixed gain which is higher than the first fixed gain. Further, the control section 110a allows the antenna switching section 103 to sequentially switch the selection of the antennas during antenna switching periods so that a plurality of antennas can be all selected. Then, the control section 110a determines as the antenna to receive the data an antenna which had been selected during an averaging period where the highest average power was measured among all average powers measured using the third gain.

Note that needless to say, the processing according to the third embodiment can be incorporated in the diversity receiving apparatuses according to the first and second embodiments. Namely, first, an average power which exceeds the first threshold value TH1 is measured, and then if the average power exceeds the first threshold value TH1 but not exceed the second threshold value TH2, the diversity receiving apparatus performs the processing according to the first embodiment. On the other hand, if the average power exceeds the second threshold value TH2 too, the diversity receiving apparatus performs the processing according to the second embodiment. Alternatively, if the average power does not exceed the first threshold value TH1 but the reception of a pattern signal is detected by a correlation value, the diversity receiving apparatus performs the processing according to the third embodiment.

Note that in the third embodiment, if the average power is below the first threshold value TH1 and the correlation peak of the pattern P is detected, in order to select an antenna capable of obtaining a higher received power, the gain is raised and the average powers of all antennas are re-measured. However, because it is possible to determine at the stage of detection of a correlation peak that a packet can be received through an antenna which has detected the correlation peak, the diversity receiving apparatus may determine as the antenna to receive data an antenna which had been selected during an averaging period where an average power generated at the stage of detection of the correlation peak was measured. By this, the antenna can be selected in a shorter period of time.

Fourth Embodiment

The block configuration of a diversity receiving apparatus according to a fourth embodiment of the present invention is the same as that of the first embodiment, and thus FIG. 1 is incorporated herein. In the fourth embodiment, the way of controlling a gain after the selection of a receiving antenna is different from that of the first embodiment.

Figure 8:
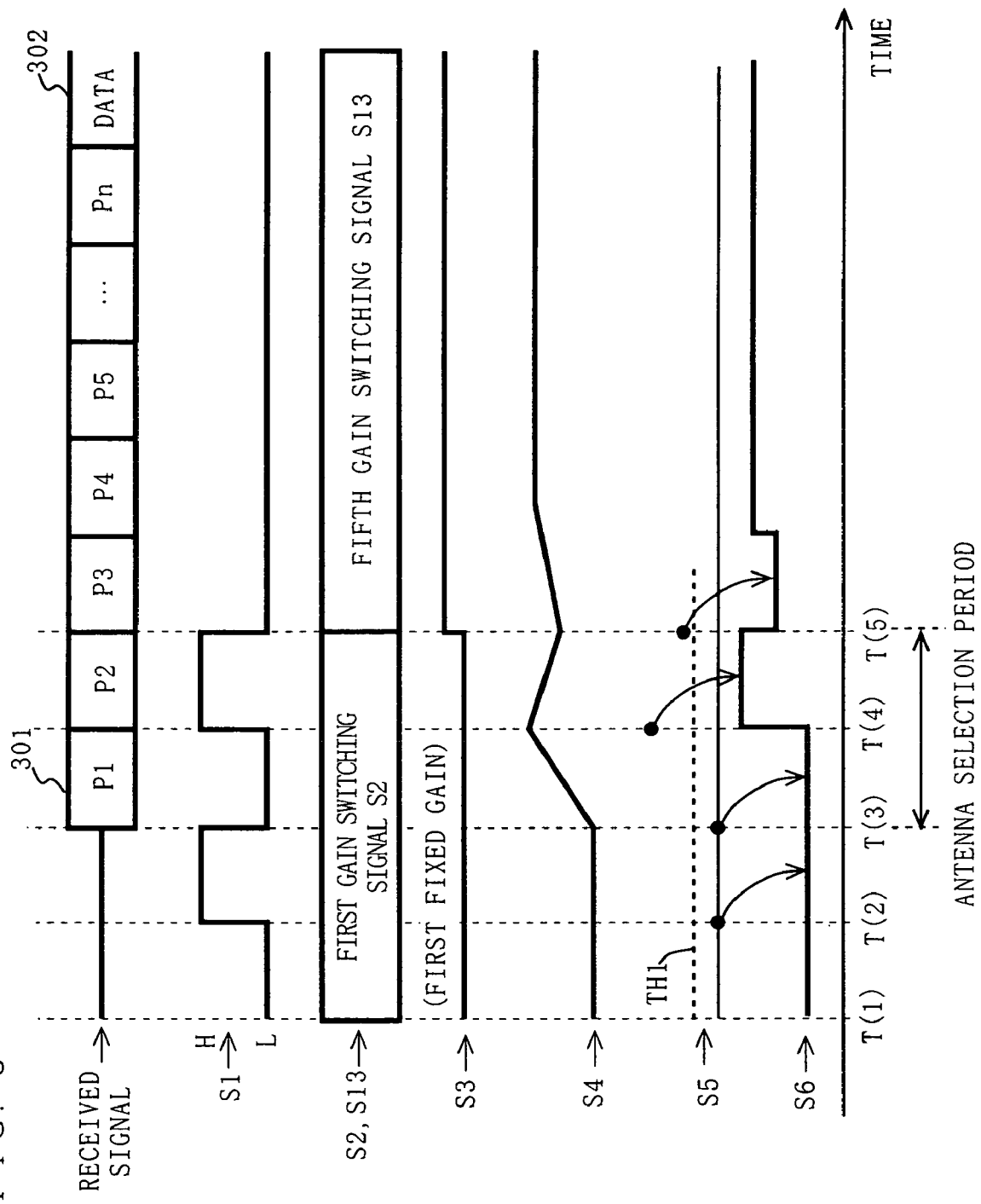
FIG. 8 is a timing chart showing the correlation between signals at the main portion of a diversity receiving apparatus according to a fourth embodiment.

FIG. 8 is a timing chart showing the correlation between signals at the main portion of a diversity receiving apparatus according to the fourth embodiment. By comparing FIG. 4 and FIG. 8, the operation of the diversity receiving apparatus according to the fourth embodiment will be described below.

In the fourth embodiment too, up to time T(5), a receiving antenna is selected in the same manner as that of the first embodiment. Here, it is assumed that a first antenna 101 is selected.

As shown in FIG. 4, in the first embodiment, in order that the reception average power of the selected antenna may have a predetermined value suitable for data demodulation, the gain control section 111 changes the gain of the gain amplifier 104 by a feedback control and thereby allows the average power to be converged to a predetermined value. However, up to the point of time T(5), since the gain is a fixed gain, a certain amount of time is required to converge a feedback loop. That is, if the received power of the selected antenna is very high or very low with respect to the fixed gain value at time T(5), the difference between the current fixed gain value and the post-convergence gain value becomes large, and therefore with the use of the feedback control it takes a long time to converge the gain.

In view of this, a control section 110 of the fourth embodiment directly determines, at the stage of time T(5) where the antenna is selected, a post-convergence gain value based on an average power S5 of a received signal, and inputs to a gain control section 111 a fifth gain switching signal S13 so that a gain amplifier 104 can operate at the determined gain value. More specifically, a signal power necessary for reception (hereinafter referred to as a "reference power") is predetermined. The gain value at which the average power of a received signal becomes the reference power can be determined by a calculation or the like. Therefore, as described above, the post-convergence gain value can be directly determined based on the average power S5 of the received signal.

The gain control section 111 controls a gain amplifier 104 such that the gain amplifier 104 operates using the post-convergence gain value specified by the control section 110.

As described above, in the fourth embodiment, after time T(5) where the antenna selection period is over, a signal can be received properly in a short period of time without the need to wait for the feedback loop to converge.

Note that the fifth gain switching signal may be an average power measured by a selected receiving antenna. In this case, the control section 110 determines an average power value measured by an antenna selected as the receiving antenna, based on an average power value S4 measured by the current antenna and an average power value S5 which is measured by another antenna and held in the holding section 107, and then outputs the average power value to the gain control section 111. The gain control section 111 determines a post-convergence gain value using the average power value of the selected receiving antenna, based on the fifth gain switching signal, and inputs the post-convergence gain value to the gain amplifier 104 as a gain control signal S3. The gain amplifier 104 adjusts the gain using the gain value specified by the gain control signal S3.

In either case, by using a determined post-convergence gain value as an initial value, the gain control section may converge the gain by the feedback control. By this, the feedback control can be converged in a short period of time.

Note that needless to say, the processing according to the fourth embodiment can be combined with the first, second, or third embodiment.

Fifth Embodiment

Figure 9:
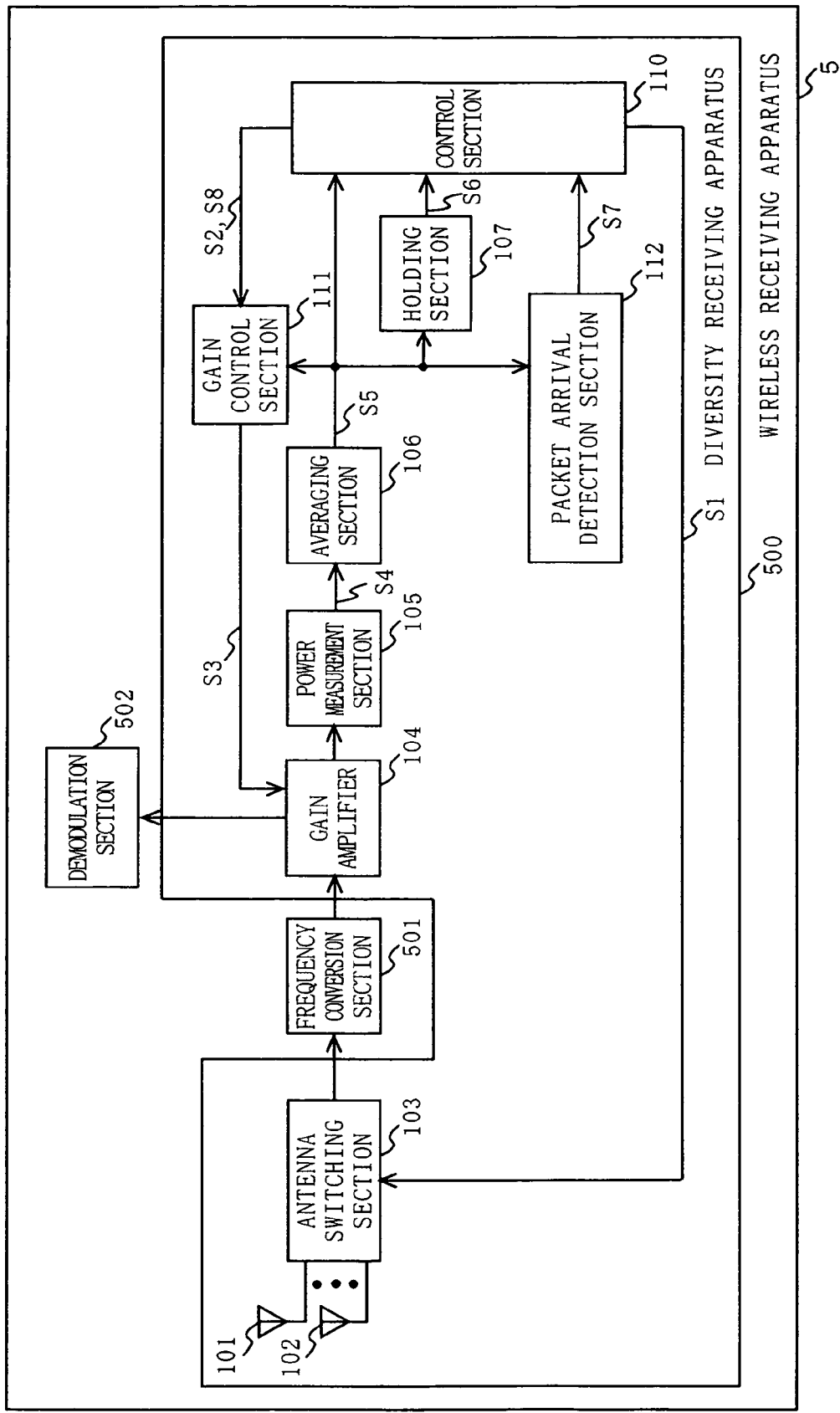
FIG. 9 is a block diagram showing a functional configuration of a wireless receiving apparatus 5 according to a fifth embodiment of the present invention.
Figure 10:
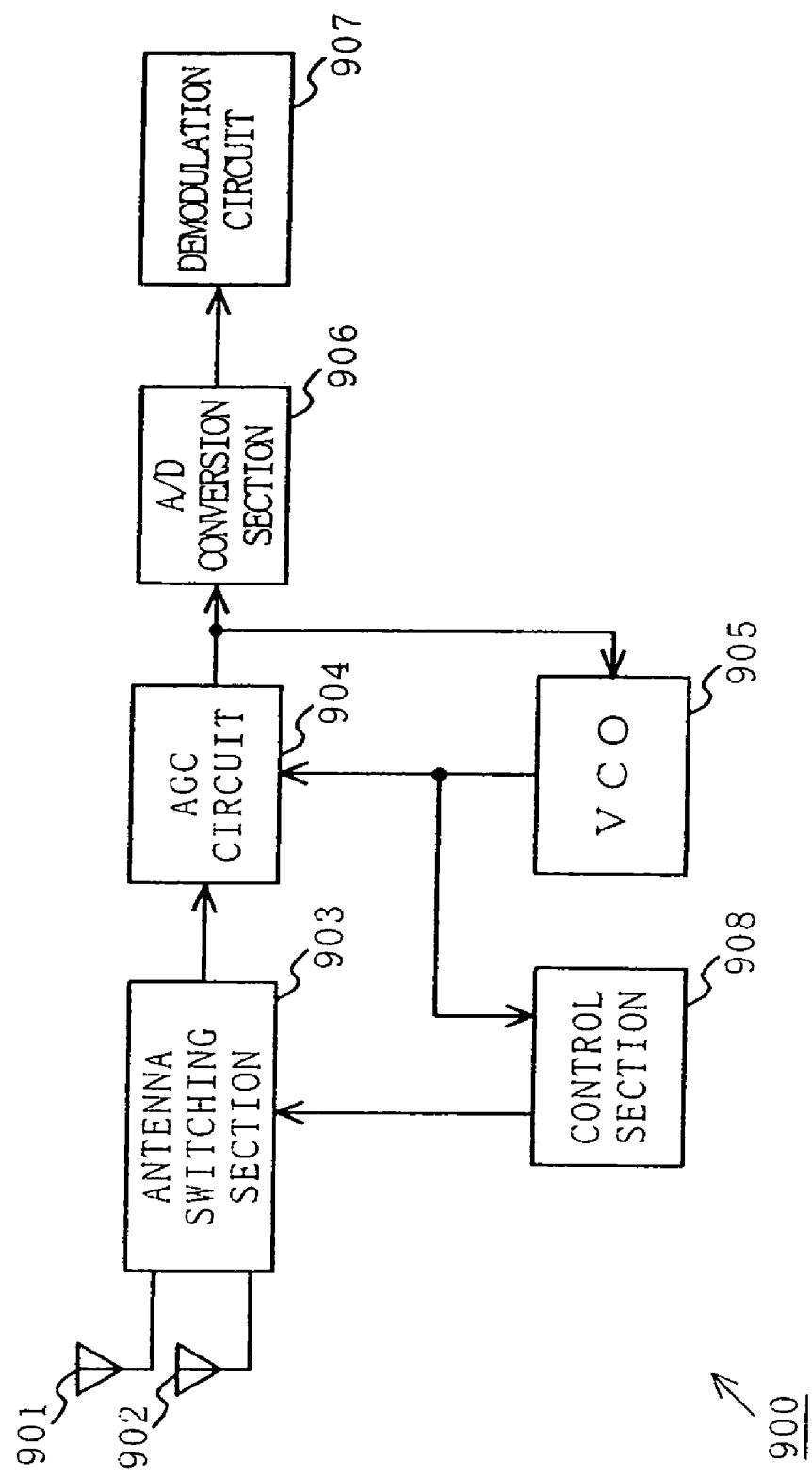
FIG. 10 is a block diagram showing a functional configuration of a conventional antenna selection diversity receiving apparatus 900 disclosed in Japanese Laid-Open Patent Publication No. 9-148973.

FIG. 9 is a block diagram showing a functional configuration of a wireless receiving apparatus 5 according to a fifth embodiment of the present invention. In FIG. 9, the wireless receiving apparatus 5 includes a diversity receiving apparatus 500, a frequency conversion section 501, and a demodulation section 502. Here, the diversity receiving apparatus 500 has the same configuration as the diversity receiving apparatus 1 according to the first embodiment, and thus elements having the same functions are denoted by the same reference numerals. Note that the diversity receiving apparatus 500 may be replaced with any of the diversity receiving apparatuses of the second to fourth embodiments.

After the antenna is selected by a control section 110, a wireless packet received by the antenna is down-converted by the frequency conversion section 501 and inputted to a gain amplifier 104. The gain amplifier 104 amplifies the signal having been down-converted and inputs the amplified signal to the demodulation section 502. The demodulation section 502 demodulates the inputted signal and outputs data.

Note that although, in FIG. 9, the signal having been down-converted by the frequency conversion section 501 is amplified by the gain amplifier 104, the signal received by the antenna may be amplified by the gain amplifier 104 and thereafter the amplified signal may be down-converted by the frequency conversion section 501.

Note that the diversity receiving apparatuses according to the first to fourth embodiments and the wireless receiving apparatus according to the fifth embodiment may be implemented as LSIs which are integrated circuits. The functional blocks of these apparatuses may be integrated in one chip, or part or all of the functional blocks may be integrated in one chip. For example, the power measurement section 105, averaging section 106, holding section 107, control section 110, packet arrival detection section 112, gain control section 111, correlation section 108, correlation detection section 109, and demodulation section 502, all or in part, may be implemented as an LSI. Here, the circuit is called an "LSI", however, depending on the degree of integration, the circuit may be called an "IC", "system LSI", "super LSI," or "ultra LSI". In addition, the method of realizing an integrated circuit is not limited to an LSI; an integrated circuit may be realized using a dedicated circuit or general processor. Alternatively, it is also possible to use an FPGA (Field Programmable Gate Array) which can be programmed after the fabrication of the LSI, or a reconfigurable processor which enables the reconfiguration of the connections or settings of circuit cells in the LSI. Further, with the advancement of semiconductor technologies or other technologies derived therefrom, if integrated circuit technologies which replace LSIs emerge, as a matter of course, functional blocks may be integrated using such technologies. The applications of biotechnologies, etc., are possible cases.

INDUSTRIAL APPLICABILITY

In the diversity receiving apparatus according to the present invention, a comparison of received powers of antennas is made using average powers which are measured in the same pattern waveform, and gain switching is controlled at the same time, whereby a comparison of powers in a wide range from a weak electric field to a strong electric field can be made accurately in a short time. Therefore, the diversity receiving apparatus can be usefully applied to high-speed wireless packet communication apparatuses and the like.

The invention claimed is:

1. A diversity receiving apparatus for receiving a packet having embedded therein symbols which are multiple repetitions of a pattern signal having a predetermined pattern, the apparatus comprising:
   a plurality of antennas;
   an antenna switching section for selecting an antenna from the plurality of antennas and outputting a signal received by the selected antenna as a received signal;
   a gain amplifier section for amplifying the received signal outputted from the antenna switching section and outputting the amplified signal;
   a gain control section for controlling a gain of the gain amplifier section;
   a power measurement section for measuring an instantaneous power of an output signal from the gain amplifier section;
   an averaging section for taking an average of the instantaneous power measured by the power measurement section on an averaging period-by-averaging period basis, and measuring the average powers, the averaging period having the same time length as one period of the pattern signal; and
   a control section for controlling the gain control section so that the gain amplifier section has a desired gain, and controlling a selection of the antennas made by the antenna switching section, wherein
   during all or part of a time period during which the pattern signals are received, the control section allows the gain control section to fix the gain of the gain amplifier section, allows the antenna switching section to sequentially switch the selection of the antennas during antenna switching periods which are synchronized with the averaging periods, and determines an antenna to receive data contained in the packet, based on levels of the average powers measured by the averaging section on an averaging period-by-averaging period basis,
   during a waiting time for the pattern signals, the control section controls the gain control section such that the gain amplifier section amplifies the received signal with a first fixed gain, and allows the antenna switching section to sequentially switch the selection of the antennas during the antenna switching periods,
   if any of the levels of the average powers measured by the averaging section during the waiting time for the pattern signals exceeds a first threshold value, the control section determines as the antenna to receive the data an antenna which had been selected during an averaging period where the highest average power was measured,
   if any of the levels of the average powers measured by the averaging section during the waiting time for the pattern signals exceeds a second threshold value which is higher than the first threshold value, the control section controls the gain control section such that the gain amplifier section amplifies the received signal with a second fixed gain which is lower than the first fixed gain, and allows the antenna switching section to sequentially switch the selection of the antennas during the antenna switching periods so that the plurality of antennas are all selected, and
   the control section determines as the antenna to receive the data an antenna which had been selected during an averaging period where the highest average power was measured among all average powers measured using the second gain.

2. The diversity receiving apparatus according to claim 1, further comprising:
   a correlation section for determining a correlation value between a signal outputted from the gain amplifier section and the pattern signal; and
   a correlation detection section for detecting a timing at which the pattern signal is received, based on the correlation value determined by the correlation section and the average power measured by the averaging section, wherein
   if any of the levels of the average powers measured by the averaging section during the waiting time for the pattern signals is lower than the first threshold value and a reception of the pattern signal is detected by the correlation detection section, the control section controls the gain control section such that the gain amplifier section amplifies the received signal with a third fixed gain which is higher than the first fixed gain, and allows the antenna switching section to sequentially switch the selection of the antennas during the antenna switching periods so that the plurality of antennas are all selected, and
   the control section determines as the antenna to receive the data an antenna which had been selected during an averaging period where the highest average power was measured among all average powers measured using the third gain.

3. The diversity receiving apparatus according to claim 1, further comprising:
   a correlation section for determining a correlation value between a signal outputted from the gain amplifier section and the pattern signal; and
   a correlation detection section for detecting a timing at which the pattern signal is received, based on a peak of the correlation value determined by the correlation section and the average power measured by the averaging section, wherein
   during a waiting time for the pattern signals, the control section controls the gain control section such that the gain amplifier section amplifies the received signal with a first fixed gain, and allows the antenna switching section to sequentially switch the selection of the antennas during the antenna switching periods,
   if any of the levels of the average powers measured by the averaging section during the waiting time for the pattern signals is lower than a first threshold value and a reception of the pattern signal is detected by the correlation detection section, the control section controls the gain control section such that the gain amplifier section amplifies the received signal with a third fixed gain which is higher than the first fixed gain, and allows the antenna switching section to sequentially switch the selection of the antennas during the antenna switching periods so that the plurality of antennas are all selected, and the control section determines as the antenna to receive the data an antenna which had been selected during an averaging period where the highest average power was measured among all average powers measured using the third gain.

4. The diversity receiving apparatus according to claim 1, wherein during a waiting time for the pattern signals, the control section controls the gain control section such that the gain amplifier section amplifies the received signal with a first fixed gain, and allows the antenna switching section to sequentially switch the selection of the antennas during the antenna switching periods, and if any of the levels of the average powers measured by the averaging section during the waiting time for the pattern signals exceeds a second threshold value, the control section determines as the antenna to receive the data an antenna which had been selected during an averaging period where the average power exceeding the second threshold value was measured.

5. The diversity receiving apparatus according to claim 1, further comprising:

a correlation section for determining a correlation value between a signal outputted from the gain amplifier section and the pattern signal; and a correlation detection section for detecting a timing at which the pattern signal is received, based on a peak of the correlation value determined by the correlation section and the average power measured by the averaging section, wherein during a waiting time for the pattern signals, the control section controls the gain control section such that the gain amplifier section amplifies the received signal with a first fixed gain, and allows the antenna switching section to sequentially switch the selection of the antennas during the antenna switching periods, and if any of the levels of the average powers measured by the averaging section during the waiting time for the pattern signals is lower than a first threshold value and a reception of the pattern signal is detected by the correlation detection section, the control section determines as the antenna to receive the data an antenna which had been selected during an averaging period where the average power lower than the first threshold value was measured.

6. The diversity receiving apparatus according to claim 1, wherein the gain control section controls the gain of the gain amplifier section using a gain value based on an average power of a signal received by the antenna having been determined by the control section.

7. A wireless receiving apparatus for receiving a packet having embedded therein symbols which are multiple repetitions of a pattern signal having a predetermined pattern, the apparatus comprising:

a diversity receiving apparatus for selecting an antenna and receiving the packet; and a demodulation section for demodulating a signal received by the diversity receiving apparatus, wherein the diversity receiving apparatus includes:

a plurality of antennas;

an antenna switching section for selecting an antenna from the plurality of antennas and outputting a signal received by the selected antenna as a received signal;

a gain amplifier section for amplifying, before or after a frequency conversion, the received signal outputted from the antenna switching section and outputting the amplified signal;

a gain control section for controlling a gain of the gain amplifier section;

a power measurement section for measuring an instantaneous power of an output signal from the gain amplifier section;

an averaging section for taking an average of the instantaneous power measured by the power measurement section on an averaging period-by-averaging period basis, and measuring the average powers, the averaging period having the same time length as one period of the pattern signal; and a control section for controlling the gain control section so that the gain amplifier section has a desired gain, and controlling a selection of the antennas made by the antenna switching section, wherein during all or part of a time period during which the pattern signals are received, the control section allows the gain control section to fix the gain of the gain amplifier section, allows the antenna switching section to sequentially switch the selection of the antennas during antenna switching periods which are synchronized with the averaging periods, and determines an antenna to receive data contained in the packet, based on levels of the average powers measured by the averaging section on an averaging period-by-averaging period basis, during a waiting time for the pattern signals, the control section controls the gain control section such that the gain amplifier section amplifies the received signal with a first fixed gain, and allows the antenna switching section to sequentially switch the selection of the antennas during the antenna switching periods, if any of the levels of the average powers measured by the averaging section during the waiting time for the pattern signals exceeds a first threshold value, the control section determines as the antenna to receive the data an antenna which had been selected during an averaging period where the highest average power was measured, if any of the levels of the average powers measured by the averaging section during the waiting time for the pattern signals exceeds a second threshold value which is higher than the first threshold value, the control section controls the Rain control section such that the gain amplifier section amplifies the received signal with a second fixed gain which is lower than the first fixed gain, and allows the antenna switching section to sequentially switch the selection of the antennas during the antenna switching periods so that the plurality of antennas are all selected, and the control section determines as the antenna to receive the data an antenna which had been selected during an averaging period where the highest average power was measured among all average powers measured using the second gain.

* * * * *

UNITED STATES PATENT AND TRADEMARK OFFICE
CERTIFICATE OF CORRECTION

PATENT NO. : 7,251,503 B2
APPLICATION NO. : 10/533207
DATED : July 31, 2007
INVENTOR(S) : Naganori Shirakata et al.

It is certified that error appears in the above-identified patent and that said Letters Patent is hereby corrected as shown below:

In column 24, claim 7, line 34, "Rain" should be --gain--.

Signed and Sealed this

Twenty-fifth Day of March, 2008

JON W. DUDAS
*Director of the United States Patent and Trademark Office*